United States Patent
Hatano et al.

(10) Patent No.: US 8,911,533 B2
(45) Date of Patent: Dec. 16, 2014

(54) METHOD OF RECOVERING GOLD FROM DILUTE GOLD SOLUTION

(75) Inventors: Kazuhiro Hatano, Hitachi (JP); Yoshifumi Abe, Hitachi (JP); Eiki Ono, Hitachi (JP); Koji Katsukawa, Hitachi (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/422,505

(22) Filed: Mar. 16, 2012

(65) Prior Publication Data

US 2012/0234138 A1 Sep. 20, 2012

(30) Foreign Application Priority Data

Mar. 18, 2011 (JP) .................. 2011-060960

(51) Int. Cl.
- C22B 11/00 (2006.01)
- C22B 3/04 (2006.01)
- C22B 3/26 (2006.01)
- C22B 3/00 (2006.01)

(52) U.S. Cl.
CPC ............. *C22B 3/0018* (2013.01); *C22B 3/0009* (2013.01); *C22B 11/04* (2013.01)
USPC .............................................. 75/744; 75/743

(58) Field of Classification Search
USPC ......................................................... 75/744
See application file for complete search history.

(56) References Cited

U.S. PATENT DOCUMENTS

| | | | |
|---|---|---|---|
| 4,390,366 A * | 6/1983 | Lea et al. ......................... | 75/423 |
| 5,942,024 A | 8/1999 | Yoshifumi et al. | |
| 2004/0144208 A1* | 7/2004 | Ando et al. ..................... | 75/743 |
| 2005/0066774 A1* | 3/2005 | Asano et al. .................... | 75/741 |
| 2009/0241735 A1 | 10/2009 | Abe et al. | |

FOREIGN PATENT DOCUMENTS

| | | |
|---|---|---|
| JP | 5-7703 A | 1/1993 |
| JP | 9-316561 A | 12/1997 |
| JP | 2009-235525 A | 10/2009 |
| JP | 2010-180450 A | 8/2010 |

OTHER PUBLICATIONS

Adams, On-site gold refining of cyanide liquors by solvent extraction, Minerals Engineering, 2003, vol. 16, p. 369-373.*
Lloyd Principles of industrial solvent extraction, 2004, Taylor & Francis Group, LLC.*

* cited by examiner

*Primary Examiner* — Roy King
*Assistant Examiner* — Xiaowei Su
(74) *Attorney, Agent, or Firm* — Birch, Stewart, Kolasch & Birch, LLP

(57) ABSTRACT

Disclosed is a method of recovering gold from an aqueous solution having a gold concentration of 10 mg/L or lower, using a plurality of extraction apparatuses for bringing the aqueous solution into contact with an extraction agent, arranged to configure a multi-stage extraction process, the method allowing the aqueous solution to continuously flow from the first-stage extraction process to the next-stage extraction process, while recycling the extraction medium used in each stage twice or more times for the extraction process of the same stage, without back extraction and reduction.

9 Claims, 3 Drawing Sheets

METHOD OF RECOVERING GOLD FROM DILUTE GOLD SOLUTION

BACKGROUND

1. Technical Field

The present invention relates to a method of efficiently recovering gold from an aqueous solution such as a post-extraction liquid containing a low concentration of gold, based on the solvent extraction process.

2. Related Art

In copper smelting, recovery of a trace amount of gold contained in the concentrate is an inevitable issue. The concentrate is processed by dry smelting or wet smelting, wherein various methods for recovering gold have been investigated for both types of smelting.

In the dry smelting, the concentrate is generally melted at high temperatures typically at 1200° C. or above, so as to produce a crude copper having a purity of approximately 98%, followed by electrolytic refining to thereby produce an electrolytic copper having a purity of 99.99%. Gold in the concentrate migrates into the crude copper, and is then concentrated in a precipitate called anode slime, which produces in the process of electrolysis. Recovery of gold starts from the anode slime, and is proceeded typically by combination of chloride leaching and solvent extraction.

On the other hand, in the wet smelting, copper in the concentrate is generally leached in a solution in a sulfuric acid bath or a chloride bath, typically followed by a combined process of solvent extraction and electrowinning, to thereby produce an electrolytic copper. Gold in this process does not concentrate or precipitate unlike in the dry smelting, and instead remains in a leaching residue and in a leachate while being not concentrated.

Typically as described in Japanese Laid-Open Patent Publication No. 2010-180450, gold remained in the leaching residue is sieved into an on-screen fraction and an under-screen fraction, and the under-screen fraction is then subjected to flotation, to thereby recover gold into the float, and processed by an additional dry or wet process.

Gold which resides in the leachate is recovered generally by adsorption on activated carbon, for the reason described below.

Techniques adoptable to separation of metals according to the wet process include ion exchange, activated carbon adsorption, electrowinning, cementation, and solvent extraction. Each process has an concentration range adapted thereto, wherein the activate carbon adsorption is generally adoptable to a solution having a metal concentration of several grams per liter or lower, and the solvent extraction process is adoptable to a solution having a metal concentration of several grams per liter or higher.

Gold concentration in the leachate which contains gold leached from ores is generally low. The gold concentration of the leachate obtained from the above-described copper smelting based on the wet process is 10 mg/L (0.01 g/L) or lower. Accordingly, the activated carbon adsorption process is generally adopted to separate gold from the copper leachate.

Gold adsorbed on activated carbon is eluted by a solution of cyan compounds, thiourea or thiosulfuric acid which readily form a complex with gold, and then recovered by cementation typically using zinc, or electrowinning. Alternatively, the activated carbon having gold adsorbed thereon is directly combusted.

Cyan compounds, thiourea and thiosulfuric acid are, however, expensive. In particular, cyan compounds are known to be toxic, so that safety and environmental impact of waste liquid treatment after the elution process remain to be solved. Combustion of the activated carbon costs high since the activated carbon is not recyclable, and additionally needs waste gas treatment since the adsorbed metals other than gold are combusted together.

SUMMARY

For example, the solvent extraction process of gold using DBC (dibutyl carbitol) can suppress pollution by other metals by virtue of its large extraction equilibrium, and needs only a short process time and simple operation since the extracted gold may be recovered only by reduction.

However, as described in the above, the solvent extraction process is generally adoptable to a solution having a metal concentration of several grams per liter of above, and is not adopted to a lechate having a gold concentration of 10 mg/L or below.

The present invention relates to a method of recovering gold mainly in wet smelting, wherein a subject of the invention is to provide a method which enables recovery of gold by the solvent extraction process from an aqueous solution having a gold concentration of 10 mg/L or below.

The present invention is directed to solve the above-described subjects, and is to provide the method described below.

(1) A method of recovering gold from an aqueous solution having a gold concentration of 10 mg/L or lower, using a plurality of extraction apparatuses for bringing the aqueous solution into contact with an extraction agent, arranged to configure a multi-stage extraction process. The method allows the aqueous solution to continuously flow from the first-stage extraction process to the next-stage extraction process, while recycling the extraction medium used in each stage twice or more times for the extraction process of the same stage, without back extraction and reduction.

(2) The method of recovering gold according to (1),
wherein the volume ratio (O/A) of the extraction medium (Or) and the aqueous solution (Aq) in the first-stage extraction process is ⅕ or smaller.

(3) The method of recovering gold according to (1) or (2),
wherein the final-stage extraction process is proceeded so as to attain a gold concentration in a post-extraction liquid of 0.5 mg/L or below.

(4) The method of recovering gold according to any one of (1) to (3), wherein the extraction medium used in the first-stage extraction process is recycled until the gold concentration reaches 1 g/L or above.

(5) The method of recovering gold according to any one of (1) to (4),
wherein the aqueous solution is a post-extraction liquid obtained after leaching of ore or concentrate which contains sulfide of copper.

(6) The method of recovering gold according to any one of (1) to (5),
implementing a reduction process for reducing a part of, or the whole of the extraction medium after being recycled in the first-stage extraction process.

(7) The method of recovering gold according to (6),
wherein the reduction process is implemented until the gold concentration in the extraction medium decreases down to 0.5 g/L or below.

(8) The method of recovering gold according to any one of (1) to (7), wherein the extraction medium used in the second-stage process or thereafter is recycled, and then a part and/or the whole of which is fed back to the extraction apparatus in the previous stage.

(9) The method of recovering gold according to any one of (1) to (8), wherein supplementation of the extraction medium for use in each stage of extraction is implemented by using one of, or two or more media selected from the extraction medium in the succeeding stage, the extraction medium from which gold was deposited in the reduction process, and a fresh extraction medium.

(10) The method of recovering gold according to any one of (1) to (9), wherein the extraction medium is dibutyl carbitol (DBC).

(11) The method of recovering gold according to any one of (1) to (10), wherein the aqueous solution is a post-extraction liquid of copper concentrate which contains 120 to 200 g/L of chlorine, 0.1 to 30 g/L of copper, 0.01 to 10 g/L of iron, and has a pH value of 2.5 or lower.

(12) The method of recovering gold according to any one of (1) to (11), removing a solid matter from the aqueous solution before the aqueous solution is brought into contact with the extraction medium.

DETAILED DESCRIPTION

Figure 1:
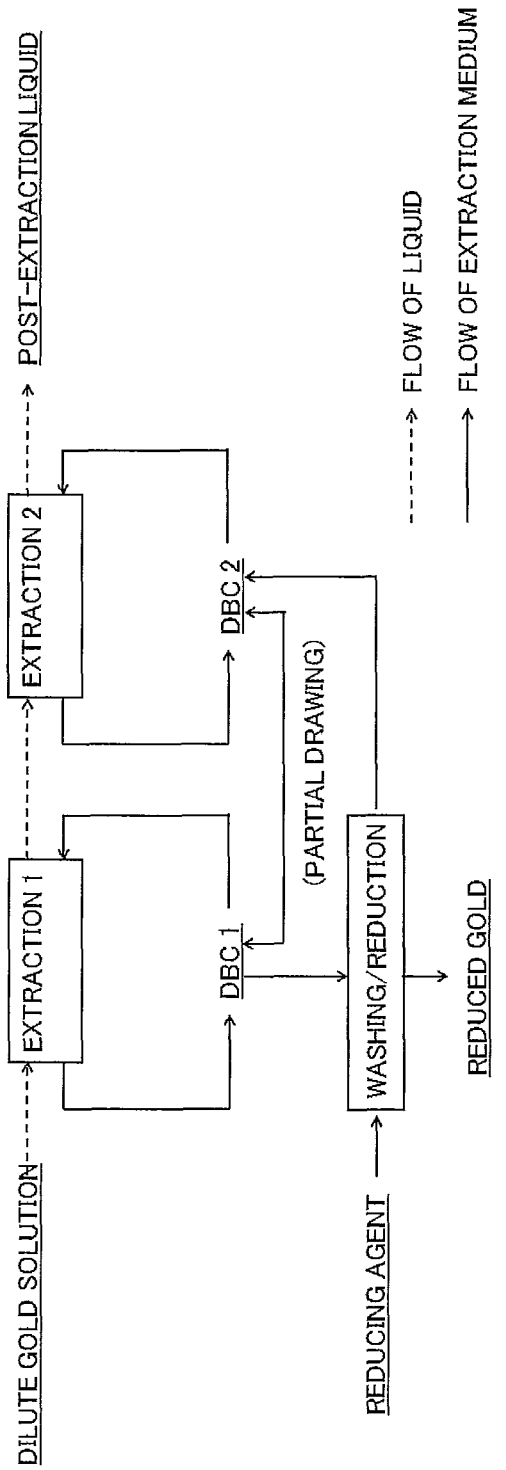
FIG. 1 is a drawing illustrating an exemplary flow of the method of recovering gold according to the present invention.

FIG. 1 illustrates an exemplary flow of a series of processes of the method of recovering gold according to the present invention. Embodiments of the present invention will be explained below, referring to FIG. 1.

Target Aqueous Solution

The present invention relates to a method of recovering gold, based on the solvent extraction process, from an aqueous solution having a gold concentration or 10 mg/L or below, particularly from a post-extraction liquid having a gold concentration of 10 mg/L or below, being obtained from leaching of ores or concentrate which contains sulfide of copper, and typically ores or concentrate which contains sulfide of copper as a major constituent. The leaching liquid is arbitrarily selectable from known ones without special limitation. In aspect of disusing cyan compounds, thiourea and thiosulfuric acid, which aspect is one feature of the present invention, it may be general to use an acidic aqueous solution of mineral acid such as sulfuric and hydrochloric acid. Accordingly, a gold-containing aqueous solution (also referred to as "pre-extraction liquid", hereinafter), which is the target solution to be treated, is generally acidic, having a pH value of 2.5 or below, and typically 0.5 to 1.5. The gold concentration in the target aqueous solution in the present invention is 10 mg/L or below, and typically 1 to 10 mg/L. Copper concentration in the post-extraction liquid is typically 0.1 to 30 g/L. In one embodiment, the target aqueous solution for gold recovery in the present invention is a post-extraction liquid of copper concentrate, and contains 120 to 200 g/L of chlorine, 0.1 to 30 g/L of copper, and 0.01 to 10 g/L of iron.

If the aqueous solution contains a solid matter, it is preferable to preliminarily remove the solid matter before being brought into contact with the extraction medium, using a thickener, filter press, cylindrical or sheet-type filter or the like, since loss of the extraction solvent is anticipated due to absorption by the solid matter.

Solvent Extraction

Operation of the solvent extraction per se may be proceeded in general ways. For example, the gold-containing aqueous solution (aqueous phase) and an extraction medium (organic phase) are brought into contact, and then mixed by stirring typically using a mixer, so as to react gold with the extraction medium. The process may be proceeded at room temperature (10 to 30° C.) to 60° C., under the atmospheric pressure. The operation is directed to each of the individual stages of extraction.

The extraction medium is selectable from known substances, such as methyl isobutyl ketone (MIBK), tributylphosphoric acid (TBP), and dibutyl carbitol (DBC), without special limitation. Among them, DBC is preferable by virtue of its stability, low volatility, and low toxicity.

While the volume ratio O/A of the extraction medium (Or) and the aqueous solution (A) is not specifically limited, it is preferably $1/5$ or smaller and more preferably $1/10$ or smaller for the first stage, taking the concentration ratio of gold into account. On the other hand, recovery ratio of gold, rather than the concentration ratio of gold, is an essential issue for the final stage (which corresponds to the second stage in FIG. 1). For this reason, the O/A is necessarily set high, preferably $1/10$ or larger, and more preferably $1/5$ or larger. Too large value of O/A at the final stage, however, results in lower gold concentration in the solvent, when the extraction liquid is supplemented to the previous extraction stage (typically, the preceding extraction stage), and consequently lowers the concentration ratio of gold, due to lowered gold concentration in the first stage. Accordingly, the O/A value in the final stage is preferably $1/2$ or smaller, and more preferably $1/3$ or smaller.

After completion of the first-stage solvent extraction in "Extraction 1", the post-extraction liquid is fed to "Extraction 2". In each of "Extractions 1 and 2", the extraction medium is recycled for repetitive use, respectively, and thereby the gold concentration in the extraction medium elevates. From the viewpoint of recovery ratio of gold, the amount of extraction medium used in "Extraction 2" is designed so as to suppress the gold concentration in the post-extraction liquid after "Extraction 2" to a predetermined concentration or below. In general, the gold concentration in the post-extraction liquid after "Extraction 2" is preferably adjusted to 0.5 mg/L or below, and more preferably 0.1 mg/L or below. In other words, "Extraction 2" is mainly directed to management of the recovery ratio of gold.

On the other hand, since the extraction medium is recycled for repetitive use also in "Extraction 1", the gold concentration in the extraction medium gradually elevates. The extraction medium is repetitively used until the gold concentration in the extraction medium used in "Extraction 1" reaches a target concentration. While higher target values of the concentration may elevate the concentration ratio of gold and may thereby facilitate the reduction process, it should be noted that the higher target values also elevate the gold concentration in the post-extraction liquid, and thereby impose the larger task on "Extraction 2". For example, the extraction medium in "Extraction 1" may be recycled until the gold concentration in the extraction medium is elevated up to 1 g/L or above, typically up to 1 to 4 g/L, and more typically up to 2 to 3 g/L. In other words, "Extraction 1" is mainly directed to management of the concentration ratio of gold.

One essential feature of the present invention is that the extraction media (DBC1, DBC2) used in "Extraction 1" and "Extraction 2", respectively, are separately prepared, and recycled principally within each stage of extraction only.

While FIG. 1 illustrates a two-stage extraction process, larger numbers of stages of extraction may be added, such as the third stage, the fourth stage and so on. When the gold concentration in the extraction media (DBC2, DBC3, DBC4, . . . ) reached the upper limit values estimated based on design values of gold concentration in the post-extraction liquid from the individual stages of extraction in the second stage and thereafter ("Extraction 2", "Extraction 3", "Extraction 4", . . . ), a part of or the whole of the solvent may be drawn out, and may be fed back to the solvent in the previous stage (typically, the preceding stage). In this way, the whole volume of solvent and the gold concentration in the solvent may more readily be controlled. In particular, the present invention has an advantage in being able to reduce the total amount of DBC to be used. Further, with respect to the multi-stage extraction process, two-stage or three-stage process is preferable in view of a balance between ease of designing the condition and the obtainable effect.

A part of, or the whole of the extraction medium (DBC1) in the first stage, having the gold concentration reached the target value as a result of recycled use, may be fed to washing/reduction process, instead of the preceding stage.

Supplementation of the extraction medium to the individual stages may be implemented after the drawing of extraction medium, using any one of, or arbitrary combinations of, the extraction medium from the succeeding stage, the extraction medium remained after precipitation of gold by the reduction process, and a fresh extraction medium.

Conditions for actual operations may be set by experimentally determining an extraction equilibrium curve which expresses relations between the gold concentration in the post-extraction liquid and the gold concentration in the extraction liquid, for the case of repetitive use of the extraction medium under specific conditions, and by setting target values of gold concentration in the post-extraction liquid and the gold concentration in the extraction medium for the individual stages.

Washing

In the process of extraction of gold, impurities such as iron may be extracted in an associated manner into the solvent. Alternatively, the leachate may sometimes reside in the solvent to give a suspension. In such a case, the extraction medium is washed before the reduction of gold, so as to remove impurities from the solvent. The washing may be proceeded using water or aqueous hydrochloric acid solution having a concentration of 0.5 to 2.0 mol/L or around. Aqueous hydrochloric acid is preferably used, since pure water shows only a poor separability of phases.

Reduction of Gold

After the optional washing, the extraction medium obtained after the extraction and the aqueous solution containing a reducing agent are brought into contact. The reducing agent adoptable herein is exemplified by oxalic acid, sodium oxalate, dextrose and ascorbic acid.

Taking the deposition form of reduced gold into account, the reduction may be proceeded using sodium oxalate at a temperature of 60° C. or above under the atmospheric pressure for 1 to 3 hours or around. From the viewpoint of the recovery ratio of gold, the reduction process is preferably proceeded until the gold concentration in the extraction medium decreases down to 0.5 g/L or below, and more preferably down to 0.1 g/L or below.

The reduced gold precipitates at the bottom of a container. The precipitate is collected and washed to be marketed.

The reduction using sodium oxalate follows the reaction formula below:

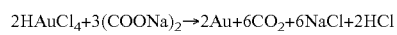

$$2HAuCl_4 + 3(COONa)_2 \rightarrow 2Au + 6CO_2 + 6NaCl + 2HCl$$

EXAMPLES

The present invention will further be detailed referring to Examples of the present invention, without limiting the scope of the present invention.

An analytical method adopted in Examples was ICP emission spectrometry.

Example 1

Extraction of Gold, Circulation of Solvent in Individual Stages

Using a liquid simulating a post-extraction liquid which is obtainable from chloride leaching of a copper concentrate (Cu: 20 g/L, Fe: 2 g/L, Au: 5 mg/L, Ag: 20 mg/L, Cl: 180 g/L, Br: 20 g/L, pH: 1.5) and DBC, a two-stage extraction was conducted as illustrated in FIG. 1, while circulating DBC in each extraction apparatus, but without the reduction operation and back extraction. Note that the operations, illustrated in FIG. 1, for drawing a part of DBC out from the second stage and adding it to DBC in the first stage, and for returning DBC after the reduction back into to the extraction medium in the second stage, were not adopted. The O/A (extraction medium/aqueous solution) values were adjusted to 1/10 (flow rate of extraction medium=3 mL/min, flow rate of aqueous solution=30 mL/min) for the first stage, and to 1/5 (flow rate of extraction medium=6 mL/min, flow rate of aqueous solution=30 mL/min) for the second stage, and the extraction operation was continued until the gold concentration in DBC in the first stage reached approximately 2.4 g/L. Results are shown in Table 1.

It was found that gold was predominantly extracted in the first stage, and repetitive use of DBC successfully elevated the gold concentration in DBC. The gold concentration in the post-extraction liquid was found to be 1.6 mg/L, and the recovery ratio of gold in the first stage was found to be 68%.

While no distinct elevation in the gold concentration in the extraction medium was observed in the second stage, which is mainly directed to management of the ratio of recovery of gold, the gold concentration in the post-extraction liquid was found to be 0.5 mg/L, and the ratio of recovery of gold in the first and second stages totaled up to 90% or above.

The values of gold concentration in the post-extraction liquid shown in Table 1 are obtained upon completion of the extraction operation, after a gold concentration in DBC in the first stage of approximately 2.4 g/L was achieved.

Figure 3:
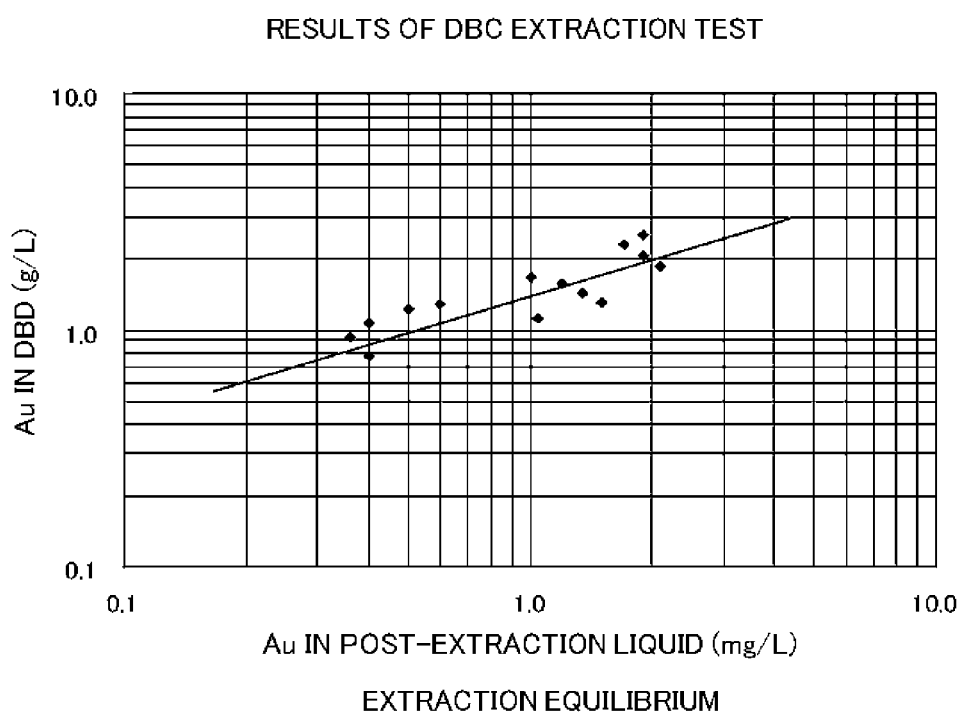
FIG. 3 is an extraction curve of gold obtained in Example.

Extraction equilibrium of gold between DBC and post-extraction liquid is shown in FIG. 3.

TABLE 1

Extraction of Gold by Circulating Solvent in Individual Stages

| | | Gold concentration (mg/L) | Ratio of recovery of gold (%) |
|---|---|---|---|
| Sample liquid | | 5 | — |
| After 1st-stage extraction | DBC after extraction | 2380 | 68 |
| | Post-extraction liquid | 1.6 | |

TABLE 1-continued

Extraction of Gold by Circulating Solvent in Individual Stages

| | | Gold concentration (mg/L) | Ratio of recovery of gold (%) |
|---|---|---|---|
| After 2nd-stage extraction | DBC after extraction | 670 | ≥90 |
| | Post-extraction liquid | 0.5 | |

Comparative Example

Extraction of Gold, Counter-Flow Contact

Figure 2:
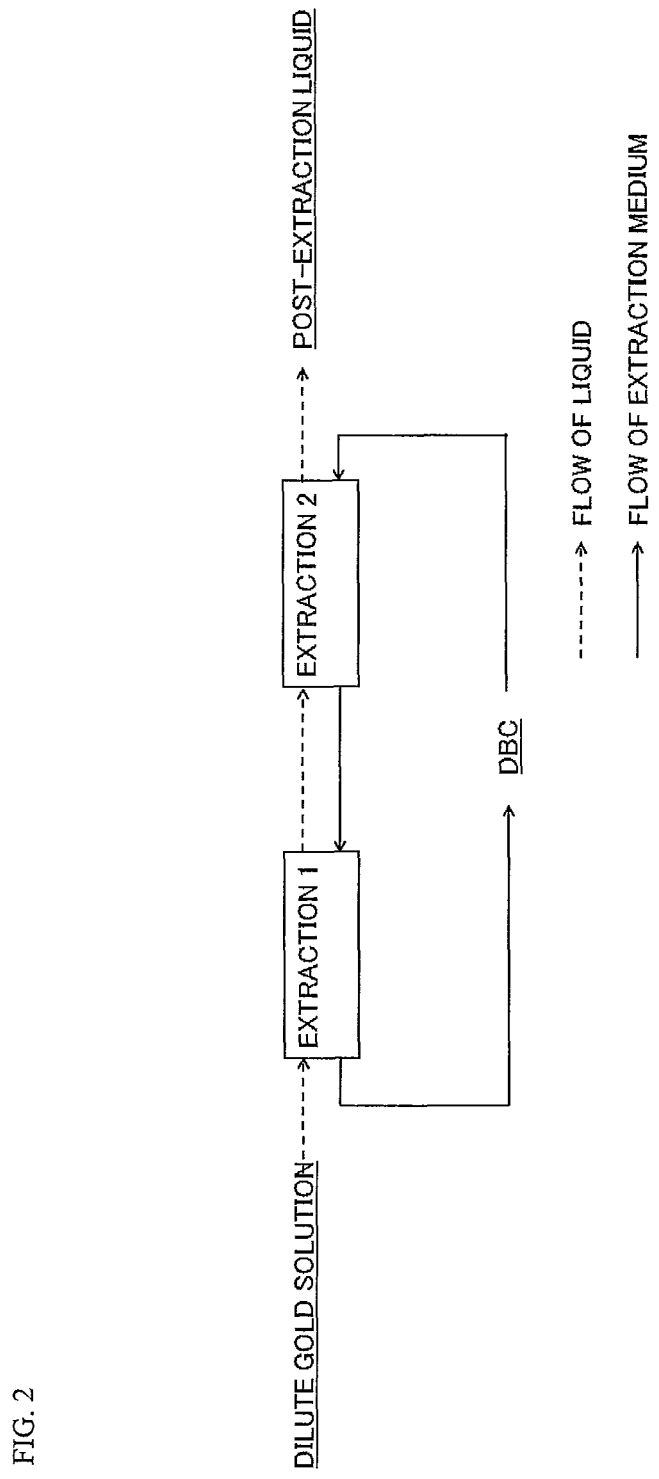
FIG. 2 is a drawing illustrating a flow of the method of recovering gold adopted in Comparative Example.

As a Comparative Example to the case of circulation of DBC in the individual stages, the sample liquid and DBC were brought into contact in a counter-flow configuration. A flow of the solvent extraction based on the counter-flow contact was shown in FIG. 2. The two-stage extraction was conducted under the conditions same with those in Example 1. The O/A value in the first and second stages was 1/10. The extraction operation was continued until the gold concentration in DBC reached approximately 2.5 g/L. Results are shown in Table 2. Note that the values of gold concentration in the post-extraction liquid shown in Table 2 are obtained upon completion of the extraction operation, after a gold concentration in DBC of approximately 2.5 g/L was achieved.

Unlike Example 1, the amount of extraction of gold was found to decrease due to monotonous increase in the gold concentration in the extraction agents, showing a gold concentration in the post-extraction liquid of 1.7 mg/L, relative to that in the extraction medium after the extraction of 2.5 g/L, with a 67% ratio of recovery. It was therefore confirmed that the ratio of recovery of gold was elevated by circulating DBC in the individual stages, even under the same number of stages.

TABLE 2

Extraction of Gold by Counterflow Contact

| | | Gold concentration (mg/L) | Ratio of recovery of gold (%) |
|---|---|---|---|
| Sample liquid | | 5 | — |
| After 1st-stage extraction | DBC after extraction | 2510 | 67 |
| | Post-extraction liquid | 1.7 | |
| After 2nd-stage extraction | DBC after extraction | 2470 | 67 |
| | Post-extraction liquid | 1.7 | |

Example 2

Reduction of Gold

Gold in DBC obtained in Example 1 was reduced using a 0.04 mol/L aqueous sodium oxalate solution.

More specifically, 100 mL of DBC with a gold concentration of 2.4 g/L was reduced by adding 100 mL of the aqueous sodium oxalate solution preliminarily warmed at 60° C., stirring the mixture for 3 hours, and allowing it to stand still through the day and night for separation.

The mixture was filtered to obtain reduced gold. Weight of the thus-obtained reduced gold was found to be 0.24 g.

Analysis of the thus-obtained gold showed contents of less than 50 mass ppm for all of silver, copper and iron. According to the present invention, since a low concentration of gold in the solvent may be recovered almost completely, especially by using sodium oxalate, so that the grade of gold, despite with a partial contamination, was found to be 99.9 mass % or above, with a ratio of recovery of nearly 100%. The gold concentration in DBC after the reduction was found to be lower than 5 mg/L. Further elevation of the grade of the thus-obtained gold is attainable by electrolytic refining, readily up to 99.99 mass % or above.

As is clear from the above, the method of recovering gold from leachate according to the present invention makes the solvent extraction process applicable also to leacheate having a gold concentration of 10 mg/L or below, and is therefore preferable as the method of recovering gold in leachate in the field of wet copper smelting.

According to the method of recovering gold from a dilute gold-containing solution of the present invention, gold may efficiently be recovered, based on the solvent extraction process, from the post-extraction liquid containing only a low concentration of gold, to which the solvent extraction process could not have been applied.

Major effects of the present invention are as follow:

(1) Gold may be recovered without using expensive and less-safety chemicals, since elution using cyan compounds, thiourea, or thiosulfuric acid in the conventional activated carbon adsorption process is no longer necessary;

(2) The process takes a shorter time as compared to that in the conventional process, and thereby total hours before obtaining the product gold and in-process inventory may be saved. Since gold is expensive, this largely benefits the economy; and (3) DBC is highly selective to gold, so that gold refining process, and marketing of gold may be simplified by using DBC.

What is claimed is:

1. A method of recovering gold from an aqueous solution having a gold concentration of 10 mg/L or lower, employing a plurality of extraction apparatuses for bringing the aqueous solution into contact with an extraction solvent arranged to configure a multi-stage extraction process, wherein the method allows the aqueous solution continuously flows from a first-stage extraction to a second-stage extraction, while recycling the extraction solvent used in each stage twice or more times within the same stage, without back extraction and reduction;

wherein in the first-stage extraction, the volume ratio (O/A) of the extraction solvent (Or) and the aqueous solution (Aq) is 1/5 or smaller, and the used extraction solvent is repeatedly used until the concentration of gold in the extraction solvent is 1 g/L or higher;

wherein in the second-stage extraction gold is repeatedly extracted until the concentration of gold in a post extraction liquid reaches to 0.5 mg/L or below; and wherein the extraction solvent present in the first-stage is separately prepared and recycled principally within the first-stage of extraction and the extraction solvent present in the second-stage is separately prepared and recycled principally within the second-stage of extraction.

2. The method according to claim 1, wherein the extraction solvent used in the second-stage process or thereafter is recycled, and then a part of which is fed back to the extraction apparatus in the previous stage.

3. The method according to claim 1, implementing a reduction process for reducing a part of, or the whole of the extraction solvent after being recycled in the first-stage extraction process.

4. The method according to claim 3,
wherein the reduction process is implemented until the gold concentration in the extraction solvent decreases down to 0.5 g/L or below.

5. The method according to claim 1,
wherein the aqueous solution is a post-extraction liquid obtained after leaching of ore or concentrate which contains sulfide of copper.

6. The method according to claim 1, wherein supplementation of the extraction solvent for use in each stage of extraction is implemented by using one of, or two or more solvent selected from the extraction solvent in the succeeding stage, the extraction solvent from which gold was deposited in the reduction process, and a fresh extraction solvent.

7. The method according to claim 1,
wherein the extraction solvent is dibutyl carbitol (DBC).

8. The method according to claim 1, wherein the aqueous solution is a post-extraction liquid of copper concentrate which contains 120 to 200 g/L of chlorine, 0.1 to 30 g/L of copper, 0.01 to 10 g/L of iron, and has a pH value of 2.5 or lower.

9. The method according to claim 1,
removing a solid matter from the aqueous solution before the aqueous solution is brought into contact with the extraction solvent.

* * * * *